United States Patent
Sandman, Jr.

(10) Patent No.: US 7,047,688 B2
(45) Date of Patent: May 23, 2006

(54) FISHING ROD HOLDER MOUNT

(75) Inventor: Arnold C. Sandman, Jr., Cincinnati, OH (US)

(73) Assignee: A.C. Sandman Jr. LLC, Cincinnati, OH (US)

( * ) Notice: Subject to any disclaimer, the term of this patent is extended or adjusted under 35 U.S.C. 154(b) by 0 days.

(21) Appl. No.: 10/876,335

(22) Filed: Jun. 25, 2004

(65) Prior Publication Data

US 2006/0048437 A1    Mar. 9, 2006

(51) Int. Cl.
*A01K 97/10*    (2006.01)

(52) U.S. Cl. .................. 43/21.2; 248/512; D22/147

(58) Field of Classification Search .............. 43/21.2; D22/147; 248/511–515, 519, 534, 535, 538, 248/540
See application file for complete search history.

(56) References Cited

U.S. PATENT DOCUMENTS

| | | | |
|---|---|---|---|
| 1,551,719 A | 9/1925 | Williams | |
| 4,176,819 A | 12/1979 | Lowe | |
| 4,645,167 A | 2/1987 | Hardwick | |
| 4,823,723 A | 4/1989 | Brooks | |
| 5,325,620 A | 7/1994 | Reed et al. | |
| D399,367 S | * 10/1998 | Sieland et al. | ............... D6/416 |
| 5,987,804 A | 11/1999 | Shearer et al. | |
| 6,681,517 B1 | 1/2004 | Solomon | |
| 2004/0025404 A1 | 2/2004 | Thompson | |

* cited by examiner

*Primary Examiner*—Michael Carone
*Assistant Examiner*—Bret Hayes
(74) *Attorney, Agent, or Firm*—Charles R. Wilson

(57) ABSTRACT

A mount for use on a recreational fishing boat is capable of holding multiple fishing rod holders and associated fishing rods. The mount comprises a sleeve member for slipping onto a seat post of a boat chair and two horizontally extending detachable rods. The sleeve member has a fastener to prevent substantial vertical and rotational movement relative to the seat post. The mount is readily removed and disassembled for compact storage.

19 Claims, 3 Drawing Sheets

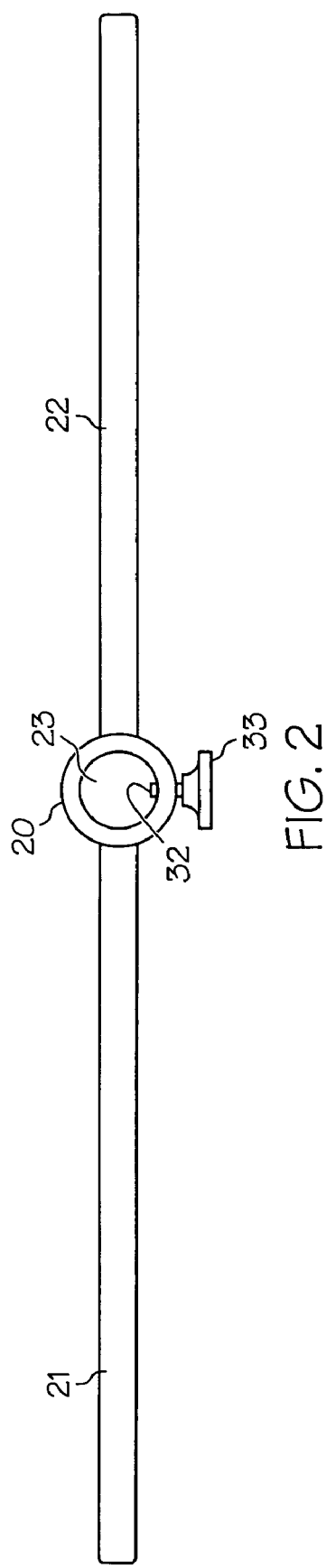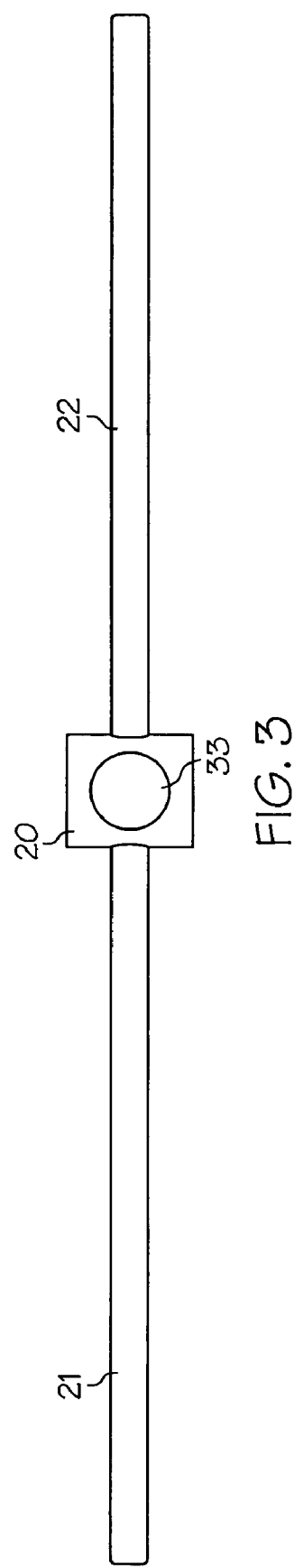

FISHING ROD HOLDER MOUNT

FIELD OF THE INVENTION

This invention relates to a fishing rod holder mount for use on a recreational fishing boat. More particularly, the invention relates to a recreational fishing boat mount which can accommodate multiple fishing rod holders and their fishing rods.

BACKGROUND OF THE INVENTION

Fishing is an activity enjoyed by many people of all ages. Most everyone has at one time or another fished from the bank of a lake, pond, or river. Pole fishing or rod and reel fishing is easily learned and has provided a relaxing time for those who have tried.

The more serious fishing enthusiast is more likely to own or at least have access to a boat. This allows the individual to venture further away from the water bank and more into uncrowded fishing areas which are of interest.

Bass boats and other small motorized boats capable of holding up to six people are affordable and are very popular. Some of these boats have a rail mounted on a top edge of the boat's hull. The rail serves many purposes, including a convenient support to attach fishing rod holders. With multiple fishing rod holders mounted on the rail, the fishing enthusiast can bait and cast multiple fishing rods. Once the fishing rods are secured in the fishing rod holders, they simply need to be monitored for fish strikes. The chances of catching a fish are obviously enhanced with the multiple fishing rods.

Many of the above described boats have one or more chairs which can be removed when not needed or installed on the spot. They tend to be swivel chairs, though not always. Typically, a floor well or other fixture affixed to the boat's deck is configured to receive and hold a seat post or pedestal of a swivel chair. A simple lifting action removes the chair, while a simple placing/dropping action installs the chair. The swivel chair obviously gives the fishing enthusiast a comfortable place to rest while waiting for fish to bite. The seat post of the swivel chair can also serve as a support on which can be mounted an accessory for fishing rod holders. U.S. Pat. Nos. 4,645,167, 4,823,723, 5,987,804 and 6,681,517 describe such accessories. Some can accommodate multiple fishing rod holders. They are particularly useful on those boats that do not have a rail permanently mounted on the boat hull's top edge.

Known accessories for mounting on a seat post of a fishing boat's chair for holding multiple fishing rod holders appear adequate. Improvement is needed, though, to provide an accessory which is economical to produce, easy to install, easy to use, and reliable in use. In accord with a widespread need, there has been developed a mount for fishing rod holders which meet all known criteria. The mount of the invention is simple in design with minimal components, thus making it economical to produce. It is readily assembled with minimal directions, thus appealing to the fishing enthusiast interested in using his time for fishing. The fact it is utilized in a fashion similar to that of a conventional fishing rod holder on a boat rail makes its use easy to understand. It is also reliable for its intended purpose due to its sturdy construction with minimal components and uncomplicated structure.

SUMMARY OF THE INVENTION

A multiple fishing rod holder mount is for use on a seat post of a boat chair such as found on recreational fishing boats. The mount is readily installed as needed. The mount comprises a sleeve member and two detachable rods extending horizontally from the sleeve member. The sleeve member has a bore extending vertically through it and is configured to slide onto the seat post with minimal lateral movement. The sleeve member further has two opposed receiving holes extending horizontally into the sleeve member. The two detachable rods fit into the opposed receiving holes for a semi-permanent attachment. The sleeve member further has a fastener to secure the sleeve member to the seat post to prevent vertical and rotational movement relative to the seat post.

The mount of the invention once properly positioned provides support for multiple fishing rod holders on its horizontally extending detachable rods. When no longer needed, the mount is readily removed and disassembled if desired for compact storage.

BRIEF DESCRIPTION OF THE DRAWINGS

FIG. 2 is a top view of the multiple fishing rod holder mount of FIG. 1.

FIG. 3 is a front side elevational view of the multiple fishing rod holder mount of FIG. 1.

DETAILED DESCRIPTION OF THE INVENTION

The multiple fishing rod holder mount of the invention is described in detail below and with particular reference to the drawings. The mount is especially useful on recreational fishing boats of the nature having chairs which are built for quick removal and installation. Such chairs have a seat post and the boat itself has a post well or other deck mounted fixture to receive the seat post. Recreational fishing boats as used herein is meant to include bass boats, sporting boats, and other small motorized fresh water boats.

Figure 1:
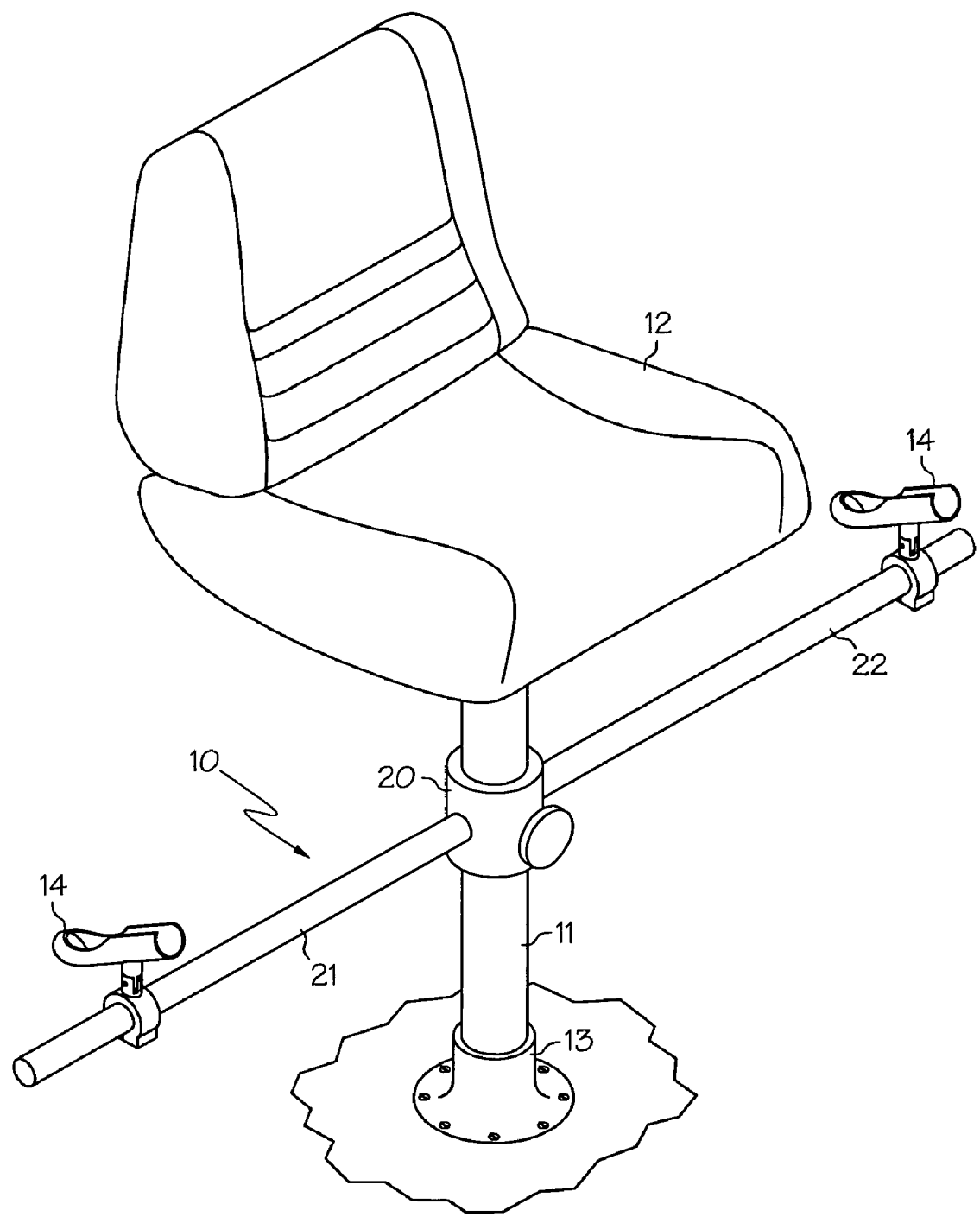
FIG. 1 is a perspective view of a swivel chair positioned on a recreational fishing boat deck with a multiple fishing rod holder mount of the invention positioned on the seat post of the chair and with two fishing rod holders in place.

With reference to FIG. 1, there is shown the mount 10 of the invention positioned on a seat post 11 of a swivel chair 12. While not evident, a pre-drilled hole in the boat deck together with a collar 13 hold the chair in place. Fishing rod holders 14 are secured to the mount 10. The fishing rod holders of the type depicted as well as many other designs are commercially available and do not form a part of this invention. As readily imagined, each fishing rod holder accommodates a fishing rod. Once the fishing line is baited and cast into the water, a handle of the fishing rod is positioned in the fishing rod holder 14 and secured by tightening a set screw or other such mechanism. Two fishing rod holders are shown. It should be understood, the mount 10 can be used to hold just one fishing rod holder, two fishing rod holders as shown, or a greater number, dependent in part on the desires of the fishing enthusiast and in part on the boat's deck lay-out and dimensions.

The mount 10 comprises as its essential components a sleeve member 20, a first detachable rod 21 and a second detachable rod 22. The components are described in detail in the following paragraphs as well as their interaction and the use of the mount. Now with reference to FIGS. 2–4, the sleeve member 20 is cylindrical-shaped and configured to slide onto the seat post of the boat chair. Most seat posts are cylindrical tubes. Accordingly, as shown, a circular bore 23 extends vertically through the sleeve member 20. The bore 23 has a diameter which is slightly larger than the outside diameter of a typical seat post. That is, the bore is dimensioned to readily slide onto and off the seat post with minimal lateral movement, i.e. play.

Figure 4:
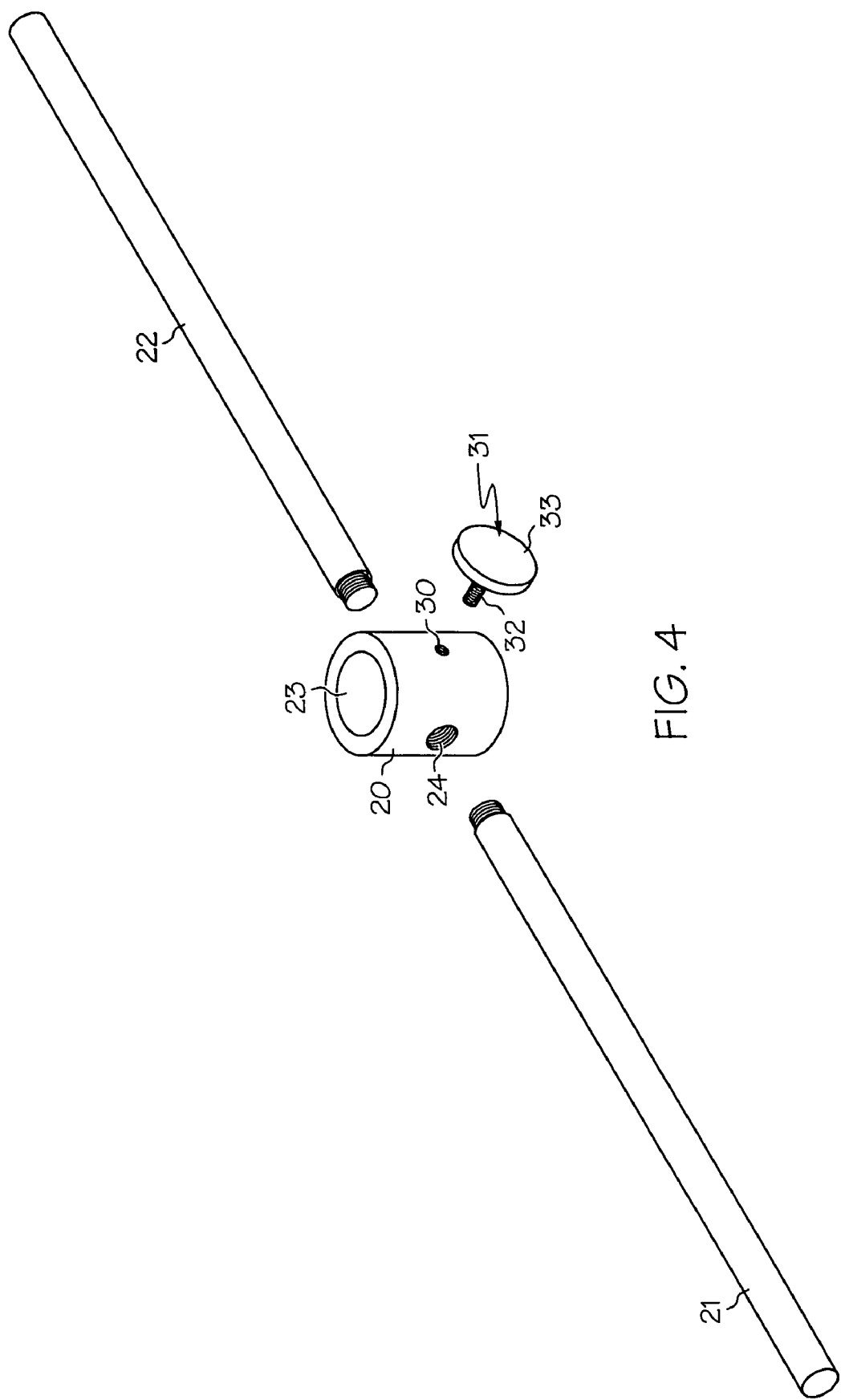
FIG. 4 is an exploded view in perspective of the multiple fishing rod holder mount of FIG. 1.

As best seen in FIG. 4, the sleeve member 20 has a first receiving hole 24 extending horizontally into a sidewall. The hole 24 can extend fully through the wall to the bore 23 or partially through the wall sufficiently deep to receive and hold the first detachable rod 21. It is threaded. While not shown, a second receiving hole is opposed the first receiving hole and is for receiving and holding the second detachable rod 22.

It should be understood the sleeve member can have other shapes than as described and shown in the drawings. For example, the outer shape of the sleeve member can be square-shaped, hexagonal-shaped, octagonal-shaped, elliptical-shaped, etc. The bore must have a shape matching that of the seat post on which it will be used. Square-shaped or other straight-sided seat posts are feasible and, accordingly, the bore of the sleeve member for such seat posts is shaped to match.

The sleeve member 20 also has a fastener to secure the sleeve member is place once properly positioned on the seat post. Several fasteners of various designs can be used. A simple but effective fastener best seen in FIGS. 2 and 4 is an adjustable fastener. It comprises a threaded bolt hole 30 drilled through the sleeve member's sidewall and a threaded knob device 31. The threaded knob device has a shank 32 and a disk 33 permanently attached at one end. The threaded knob device is threadable into the hole 30 and forms a secure fastening simply by turning the disk until the end of its threaded shank contacts the seat post for a friction fit.

The threaded knob device 31 of the sleeve member can be tightened sufficiently to prevent vertical movement of the mount up and down the seat post. It also can be tightened sufficiently to prevent rotational movement of the mount about the seat post as may happen when a fish strikes the line of one of the fishing rids to exert a force on only one detachable rod.

Other fasteners include set screws, rivet pins, and retainer bolts. However, the threaded knob device is preferred and, for this reason, is described in detail above.

The first detachable rod 21 and the second detachable rod 22 are identical in structure and function. Each rod is sufficiently long to hold at least one fishing rod holder, preferably at least two fishing rod holders. This requires a rod length of from about 10 inches to about 30 inches, preferably from about 18 inches to about 24 inches. The lesser length is required to hold one fishing rod holder near a distal terminus and still allow a needed clearance with the chair. The greater length allows at least two fishing rod holders sufficiently spaced to permit adequate fishing rod maneuverability. It is highly preferred that the rods be round. The diameter of the rod is ideally sized to equal that of standardized boat rails which extend around the top edge of many recreational fishing boat hulls. This is because many known fishing rod holders intended for use on the boat rails can then be used on the mount 10 of the invention as well. Preferably, the diameter of the rods 21 and 22 are each from about 0.50 inches to about 1.25 inches.

The detachable rods 21 and 22 are each threaded at one end for threading engagement in the receiving holes of the sleeve member. The threads of the rods must mate with the threads of the receiving hole, otherwise there is no criticality in their sizing.

Various materials can be used to manufacture the sleeve member and the detachable rods of the mount. Metals such as stainless steel and aluminum which are easily machined are acceptable. Plastics of all nature which are machineable or moldable are also acceptable. Composites of fibrous reinforced resinous materials which are rigid in nature also can be used as well as virtually all other rigid materials capable of withstanding forces and conditions encountered by the mount during ordinary use.

The multiple fishing rod holder mount is readily installed on the boat chair's seat post. The chair is first disengaged from the boat's deck, normally just by a lifting action. The sleeve member of the mount is slipped onto the seat post and the chair reinstalled on the boat deck. Now, the sleeve member is slid to a desired height, rotated to a desired detachable rod orientation, and the fastener tightened. It should be apparent that the structure of the boat including its components do not need to be permanently altered by screw holes, brackets and the like. That is, the integrity of the boat has not been impaired, as many boat owners demand.

The fishing enthusiast is now free to fish using multiple fishing rods. Fishing lines are cast and the fishing rods secured in one of the multiple fishing rod holders on the mount. As many fishing lines can be cast as there are fishing rod holders on the mount. The fishing enthusiast can now sit or wander about the boat unencumbered by the need to constantly hold a fishing rod waiting for a fish to strike. The mount is useful for troll fishing. It is also useful for conventional fishing in one locale.

Optional features which enhance the use of the mount can be utilized. For example, a restraint system can be used to prevent the mount from spinning even when excessive forces are applied, e.g. a line snag while troll fishing. A bungee cord or inelastic cord secured to one or both of the detachable rods and the boat hull is a safety feature which could prove beneficial. Adaptor liners for the bore of the sleeve member can be used if a less than standard sized seat post is encountered. Plastic-tipped rod ends to prevent accidental leg scrapings and abrasions also can be easily added to the mount. Other features which enhance the appearance of the mount are contemplated as well.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A multiple fishing rod holder mount for temporary installation on a recreational fishing boat without affecting the integrity of the boat, said mount comprising:

(a) a sleeve member for sliding onto a seat post of a boat chair of the recreational fishing boat, said sleeve member having (i) a bore extending vertically therethrough and configured for said sleeve member to readily slide onto the seat post with minimal lateral movement, (ii) a first receiving hole extending horizontally into the sleeve member, (iii) an opposed second receiving hole extending horizontally into the sleeve member, and (iv) a fastener for securing the sleeve member to the seat post to prevent vertical movement on the seat post and to prevent rotational movement about the seat post;

(b) a first detachable rod held in the first receiving hole of the sleeve member, and supporting at least one fishing rod holder; and (c) a second detachable rod held in the second receiving hole of the sleeve member, for extending in a direction opposite to that of the first detachable rod and supporting at least one fishing rod holder, whereby the multiple fishing rod holder mount is installable without physical alteration of the recreational fishing boat's hull or other structure and readily removable for disassembling and storing.

2. The multiple fishing rod holder mount of claim 1 wherein the sleeve member is cylindrical-shaped.

3. The multiple fishing rod holder mount of claim 2 wherein the bore of the sleeve member is cylindrical-shaped.

4. The multiple fishing rod holder mount of claim 1 wherein the first receiving hole and the second receiving hole of the sleeve member are each internally threaded.

5. The multiple fishing rod holder mount of claim 4 wherein the first detachable rod and the second detachable rod each have one end externally threaded for respectively threading into the first receiving hole and the second receiving hole of the sleeve member.

6. The multiple fishing rod holder mount of claim 5 wherein each of the first and second detachable rods has a length of from about 10 inches to about 30 inches.

7. The multiple fishing rod holder mount of claim 6 wherein each of the first and second detachable rods has a substantially identical length of from about 18 inches to about 24 inches.

8. The multiple fishing rod holder mount of claim 7 wherein each of the first and second detachable rods has a diameter of from about 0.50 inches to about 1.25 inches.

9. The multiple fishing rod holder mount of claim 1 wherein the fastener of the sleeve member comprises an internally threaded hole extending into the sleeve member and an externally threaded knob device for screwing into the threaded hole until contact is made with the seat post of the chair for a friction fit.

10. A multiple fishing rod holder mount for temporary installation on a recreational fishing boat without affecting the integrity of the boat, said mount comprising:
  (a) a sleeve member for sliding onto a seat post of a boat chair of the recreational fishing boat, said sleeve member having (i) a bore extending vertically therethrough and configured for said sleeve member to readily slide onto the seat post with minimal lateral movement, (ii) a first internally threaded receiving hole extending horizontally into the sleeve member, (iii) an opposed second internally threaded receiving hole extending horizontally into the sleeve member, and (iv) an adjustable fastener for securing the sleeve member to the seat post in a friction fit to prevent vertical movement on the seat post and to prevent rotational movement about the seat post;
  (b) a first substantially straight detachable rod threaded into the first receiving hole of the sleeve member, said first detachable rod having a length of from about 10 inches to about 30 inches to extend from the sleeve member and supporting at least one fishing rod holder; and
  (c) a second substantially straight detachable rod threaded into the second receiving hole of the sleeve member, said second detachable rod having a length substantially identical to the length of the first detachable rod and supporting at least one fishing rod holder, whereby the multiple fishing rod holder is installable without physical alteration of the recreational fishing boat's hull or other structure and readily removable for disassembling and storing.

11. The multiple fishing rod holder mount of claim 10 wherein the sleeve member is cylindrical-shaped and the bore of the sleeve member is cylindrical-shaped.

12. The multiple fishing rod holder mount of claim 10 wherein the adjustable fastener of the sleeve member comprises an internally threaded hole extending into the sleeve member and an externally threaded knob device for screwing into the threaded hole until contact is made with the seat post of the chair for a friction fit.

13. The multiple fishing rod holder mount of claim 10 wherein each of the first and second detachable rods has a substantially identical length of from about 10 inches to about 30 inches and has a substantially identical diameter of from about 0.50 inches to about 1.25 inches.

14. A mount for holding at least four fishing rod holders and for temporary installation on a recreational fishing boat without affecting the integrity of the boat, said mount comprising:
  (a) a cylindrical-shaped sleeve member for sliding onto a seat post of a boat chair of the recreational fishing boat, said sleeve member having (i) a cylindrical-shaped bore extending vertically therethrough and configured for said sleeve member to readily slide onto the seat post with minimal lateral movement, (ii) a first internally threaded receiving hole extending horizontally partially into the sleeve member, (iii) an opposed second internally threaded receiving hole extending horizontally partially into the sleeve member, (iv) a threaded bolt hole extending horizontally into the sleeve member to the bore, and (v) a threaded knob device for securing the sleeve member to the seat post in a friction fit, said threaded knob device having a threaded shank for threading into the threaded bolt hole and a disk attached to one end of the threaded shank for tightening or loosening the threaded shank relative to the seat post of the chair;
  (b) a first substantially straight detachable rod threaded into the first receiving hole of the sleeve member, said first detachable rod having a length of from about 10 inches to about 30 inches and a diameter of from about 0.50 inches to about 1.25 inches and supporting at least one fishing rod holder; and
  (c) a second substantially straight detachable rod threaded into the second receiving hole of the sleeve member, said second detachable rod having a length substantially identical to the length of the first detachable rod and having a diameter substantially identical to the diameter of the first detachable rod and supporting at least one fishing rod holder.

15. The multiple fishing rod holder mount of claim 1 wherein the first and the second detachable rods are each substantially straight.

16. The multiple fishing rod holder mount of claim 15 wherein the first and the second detachable rods are each substantially identical in length.

17. The multiple fishing rod holder mount of claim 15 wherein the first and the second detachable rods are each substantially identical in diameter.

18. The multiple fishing rod holder mount of claim 1 having two fishing rod holder secured on each of the detachable rods.

19. The multiple fishing rod holder mount of claim 14 having two fishing rod holder secured on each of the detachable rods.

* * * * *